(12) United States Patent
Tsai et al.

(10) Patent No.: US 6,393,124 B1
(45) Date of Patent: May 21, 2002

(54) CPE ALERT SIGNAL TONE DETECTOR

(75) Inventors: Chieh-Wen Tsai, Goleta; David Y. Wong, Santa Barbara, both of CA (US)

(73) Assignee: Virata Corporation, Raleigh, NC (US)

( * ) Notice: Subject to any disclaimer, the term of this patent is extended or adjusted under 35 U.S.C. 154(b) by 0 days.

(21) Appl. No.: 08/964,573

(22) Filed: Nov. 5, 1997

Related U.S. Application Data

(60) Provisional application No. 60/043,562, filed on Apr. 15, 1997.

(51) Int. Cl.[7] ............................. H04M 1/00; H04M 1/56
(52) U.S. Cl. .................... 379/386; 379/142.01; 379/372
(58) Field of Search ................. 379/372, 376, 379/377, 1, 27, 147, 237, 252, 386, 286, 6, 387.9, 387.02, 388.06, 391, 373.01, 283; 375/317

(56) References Cited

U.S. PATENT DOCUMENTS

| | | | | |
|---|---|---|---|---|
| 5,353,346 A | * | 10/1994 | Cox et al. ................... | 379/386 |
| 5,519,774 A | * | 5/1996 | Battista et al. ............... | 379/386 |
| 5,809,133 A | * | 9/1998 | Bartkowiak et al. ........ | 379/386 |
| 5,862,212 A | * | 1/1999 | Mathews ..................... | 379/386 |
| 5,995,557 A | * | 11/1999 | Srinivasan ................... | 379/283 |

* cited by examiner

Primary Examiner—Duc Nguyen
Assistant Examiner—George Eng
(74) Attorney, Agent, or Firm—Foley & Lardner

(57) ABSTRACT

Multiple characteristics of an signal are measured to determine the presence of an alert tone on an incoming signal to a customer premises equipment (CPE) in preparation for receipt of FSK modem signals. The apparatus, method, and article of manufacture discern the presence of an alert tone by measuring characteristics of the incoming signal. The alert tone is able to be discerned even under crosstalk conditions and over a wide dynamic range with the digital signal processing (DSP) method and apparatus described. Multiple characteristics of the signal are measured to determine the presence of the alert tone.

32 Claims, 4 Drawing Sheets

CPE ALERT SIGNAL TONE DETECTOR

CROSS REFERENCE TO RELATED APPLICATION

This application is a utility application based on U.S. provisional patent application Ser. No. 60/043,562, filed on Apr. 15, 1997, entitled "CPE ALERT SIGNAL TONE DETECTOR," by Chieh-Wen Tsai, et al., which application is incorporated by reference herein.

BACKGROUND OF THE INVENTION

1. Field of the Invention

This invention relates in general to digital signal processing, and more particularly to a customer premises equipment (CPE) alert signal tone detector.

2. Description of Related Art

In the field of electronics, accurate data transfer over telephone lines has become one of the greatest demands on any data system. The problems of discerning a proper data incoming tone, false signal recognition, and ensuring that data is not lost during noisy transmission have been challenges for engineers to overcome.

Customer premises equipment (CPE) can take many forms, e.g., facsimile machines, computer modems, or other telephone interface equipment.

Further, new features offered by telephone service providers, such as caller ID, caller ID with call waiting, and Analog Display Services Interface (ADSI) require that a telephone switch transmit and receive digital data and voice signals over the same standard analog phone connection, making the detection of a specific tone even more difficult.

The first and largest problem that this class of data transfer system faces is how to determine whether there is data coming in.

It can be seen, then, that there is a need for a system that can alert the CPE when there is incoming data. It can also be seen that the CPE alert system must work under a variety of conditions.

SUMMARY OF THE INVENTION

To minimize the limitations in the prior art described above, and to minimize other limitations that will become apparent upon reading and understanding the present specification, the present invention discloses a method, apparatus, and article of manufacture for detecting a Customer Premises Equipment (CPE) alert signal (CAS) tone.

The present invention solves the above-described problems by measuring various characteristics of the incoming signal to determine if the signal is a CPE alert tone.

A method in accordance with the principles of the present invention comprises measuring an RMS level, a twist, a side band, and a frequency of an incoming signal and storing the measurements in a memory of a computer, verifying that the RMS level of the incoming signal exceeds a threshold, verifying that the RMS level of the incoming signal exceeds that of a level of the side band of the incoming signal, verifying that the twist of the incoming signal does not exceed a given value, verifying that the frequency of the incoming signal is within a percentage of a nominal value for the incoming signal, and enabling continued receipt of an incoming signal to the memory of the computer based on the verification of the RMS level, the verification of the twist, and the verification of the frequency of the signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a method, apparatus, and article of manufacture for detecting a Customer Premises Equipment (CPE) Alert Signal (CAS). The method, apparatus, and article of manufacture described herein can also be used to detect other types of tones, either at a single frequency or multiple frequencies.

The new features offered by telephone service providers, such as caller ID with call waiting, and Analog Display Services Interface (ADSI) require that telephone switches transmit and receive both digital data and voice signals on the same standard analog phone connection. The ability of the analog connection to switch between digital data and voice signals is dependent on the ability to change the CPE from voice mode to data mode and vice versa.

The change from voice mode to data mode is initiated by the phone switch by sending a CAS to the CPE to alert the CPE that data transmission is requested. If the CPE acknowledges the CAS, typically by sending a standard Dual Tone Multiple Frequency (DTMF) signal, then the phone switch will begin transmitting data (e.g., modem signals, etc.) to the CPE. Further, to avoid audio transmission of the data signal and voice interference with the data signal, the CPE mutes the handset microphone and speaker.

If the CPE fails to detect the CAS, data transmission will be delayed indefinitely; conversely, if the CPE falsely triggers on voice or other signals, then the voice conversation will be interrupted with unwanted sending of DTMF signals and muting of the handset.

Further, the CAS detector must be implemented with minimal hardware costs in order to make the CAS detector available to a wide range of electronic applications. Thus, the mathematical approach to detect the CAS tone must require the least amount of computing power possible, in order to allow the CAS tone detector to operate with existing low cost microprocessors.

The CAS detector must meet demanding requirements that have been set by Bellcore. These requirements include reliable detection of CAS signals that deviate from the nominal signal specification, recognition of CAS signals in the presence of the CPE user's voice, and avoiding false triggering of the CAS in the presence of signals that imitate or approximate CAS tones.

Figure 1:
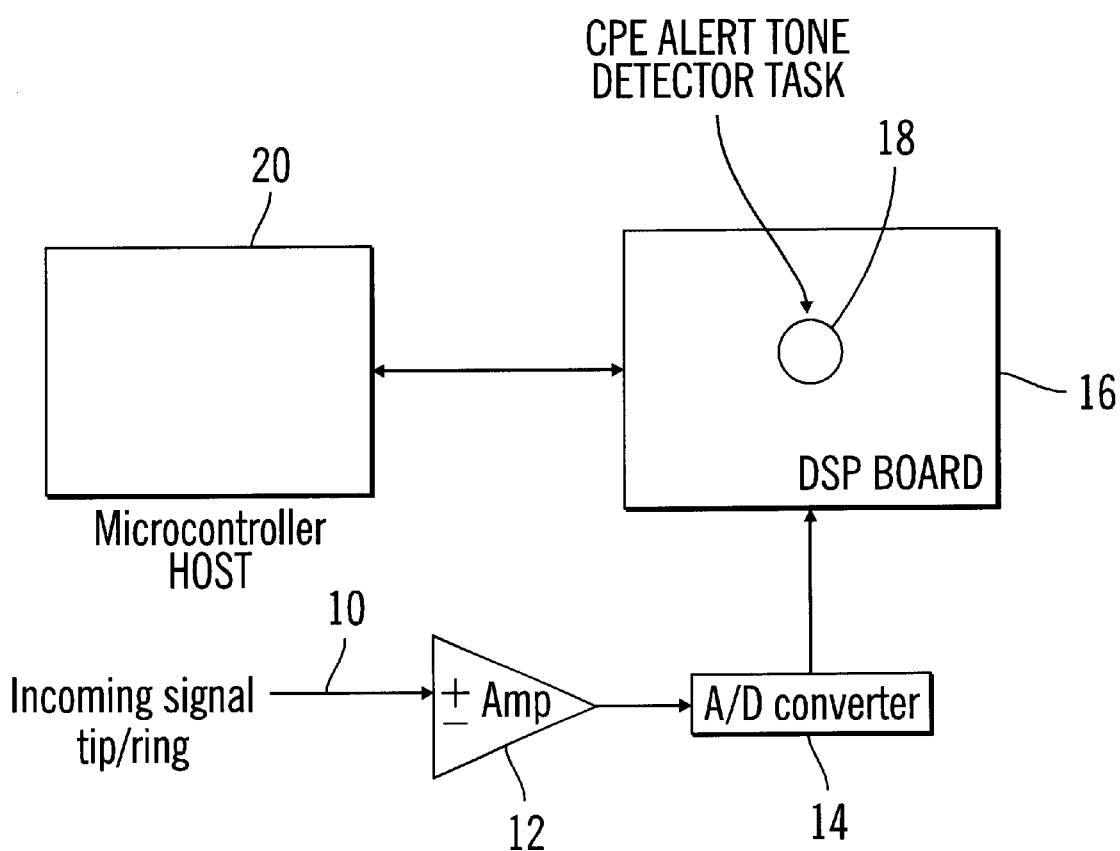
FIG. 1 shows a CAS Detector Hardware Configuration according to the present invention.

FIG. 1 shows a CAS Detector Hardware Configuration according to the present invention.

An incoming signal (tip/ring) 10 is coupled to an amplifier 12 to amplify the signal 10 to proper levels. Once the amplification takes place, an analog-to-digital (A/D) converter 14 then converts the analog signal 10 into a digital representation of the incoming signal. Once the incoming signal 10 has been converted, the signal is passed to a digital signal processing board (DSP) 16 that executes a CPE Alert Signal (CAS) task 18. The DSP board 16 interfaces with the microcontroller (Host) 20 to inform the host 20 that a CAS tone has been received.

Those skilled in the art will recognize that the invention could be practiced using any digital signal processing circuit, such as an ASIC, logic circuit, or individual logic gates, or other single or multiple processors or processing elements or circuits, or other electronic circuitry without departing from the present invention.

Figure 2:
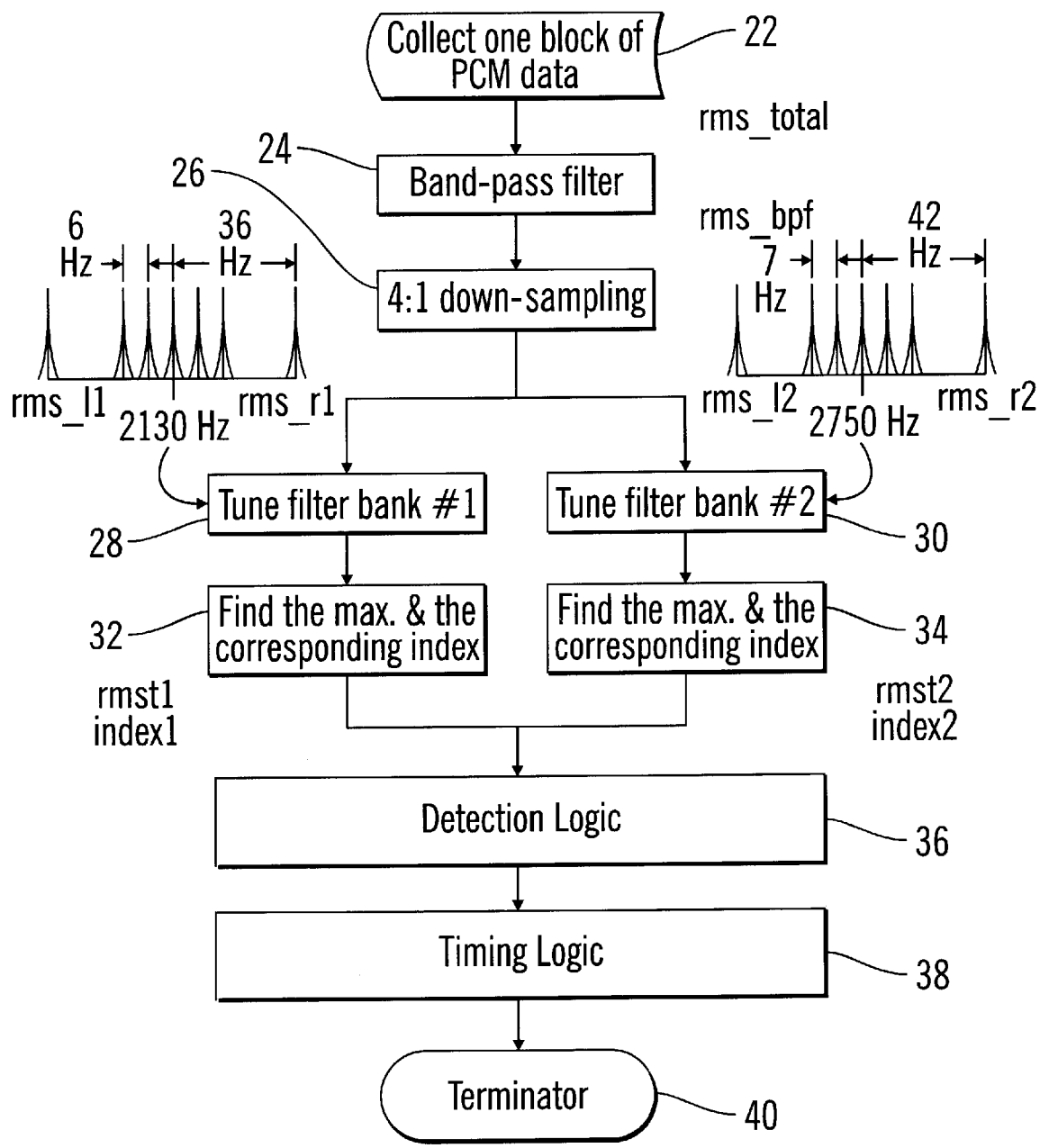
FIG. 2 is a flow chart that illustrates the logic of the CPE Alert Signal Tone Detector according to the present invention.

FIG. 2 is a flow chart that illustrates the logic of the CPE Alert Signal Tone Detector according to the present invention.

Input pulse code modulated (PCM) data is collected into blocks of 64 samples. The PCM data is assumed to be 14 bit linear. The input amplifier and analog-to-digital converter are adjusted so that 0 dBm at tip/ring produces PCM data with an RMS value of 4004.

The CPE Alert Signal (CAS) tone is sent from a central office (CO) to alert the customer premises equipment (CPE) to prepare for receiving FSK modem signals. Block 22 shows collecting one block of pulse code modulated (PCM) data to determine if a CAS tone is present. The CAS tone comprises a dual frequency tone (2130 Hz and 2750 Hz) with a period of 80–85 ms, specified in Bellcore specification SR-TSV-002476, which is hereby incorporated by reference.

The specification for the CAS tone is as follows:

| | |
|---|---|
| Lower Frequency Tone Limit | 2130 Hz ± 0.5% |
| Upper Frequency Tone Limit | 2750 Hz ± 0.5% |
| Dynamic Range | −32 to −14 dBm per tone |

Tones with levels from −14 to −32 dBm must be accepted by the CPE, but tones below −45 dBm must be rejected to avoid false detection due to crosstalk.

| | |
|---|---|
| Power Differential Within Dynamic Range | 0 to 6 dB between tones |
| Tone Duration at CPE | 75 to 85 ms |

The RMS value rms_total is also computed at the input.

$$\text{rms\_total} = \sqrt{\frac{1}{N} \sum_{i=0}^{N-1} x^2[i]}$$

Where N=64 (for 8 ms of data)

Since there is only a need to keep frequency information of the input from 2 to 3 kHz, block 24 shows a bandpass filter that is employed to remove the frequency information outside of this range. The RMS value rms_bpf is computed after filtering as follows:

$$H_{bp}(z) = \frac{\begin{matrix}0.00586 + 0.00732z^{-1} - 0.00049z^{-2} + 0.00293z^{-3} + \\ 0.01074z^{-4} + 0.00293z^{-5} - 0.00049z^{-6} + 0.00732z^{-7} + \\ 0.00586z^{-8}\end{matrix}}{\begin{matrix}1 + 2.83594z^{-1} + 6.11865z^{-2} + 8.26025z^{-3} + 9.17529z^{-4} + \\ 7.13379z^{-5} + 4.56152z^{-6} + 1.81152z^{-7} + 0.55225z^{-3}\end{matrix}}$$

$$x_{bp}[i] = \sum_{j=0}^{8} a[j] \cdot x[i-j] - \sum_{j=1}^{8} b[j] \cdot x_{bp}[i-j]$$

$$\text{rms\_bpf} = \sqrt{\frac{1}{N} \sum_{i=0}^{N-1} x_{bp}^2[i]}$$

Block 26 then shows a 4:1 down-sampling is performed to reduce the computational load in the later processing. Note that after down-sampling, the sample rate is at 2 kHz and the two frequency components of the CAS tone are at 130 and 750 Hz. The 4:1 down-sampling of block 26 retains only the first sample of every four consecutive data samples, which reduces the computation required to determine the spectral trajectories of the incoming signal near the CAS tone frequencies by a factor of four. Further, the down-sampling technique allows for filter 28 and 30 designs that are easier to implement. The down-sampling of block 26 also allows the in-band RMS values to be computed without additional filtering operations.

Typically, the complexity of a highly tuned filter goes up as a result of the Q-factor, where Q is the center frequency of the filter divided by the bandwidth of the filter. Thus, at 2130 Hz, a tuned filter with a 4 Hz bandwidth has a Q of 532. However, after down-sampling as in the present invention, the center frequency of the filter 28 is shifted to 130 Hz, and for a 4 Hz bandwidth, the Q is reduced to 32.5.

Due to the fact that a frequency shift of ±0.5% is allowed in the transmission channel, blocks 28 and 30 show the down-sampled data passing through two groups of digital filters. Block 28 shows filter bank number 1, while block 30 shows filter bank number 2. The center frequency of each tune filter bank 28 and 30 is shown in Table 1, the bandwidth of each tune filter 28 and 30 is 4 Hz.

The tune filters 28 and 30 are a small set of highly tuned filters clustered around each of the two nominal CAS center frequencies. The tune filters 28 and 30 extract detailed spectral trajectories for the CAS tones. Further, the tune filters 28 and 30 include filters immediately adjacent to the center frequency, wherein one filter in each group of tune filters 28 and 30 is centered on the nominal CAS frequency for that group. The other four tune filters in tune filter 28 are spaced at increments of 6 Hz from the nominal CAS frequency, two filters having center frequencies above the nominal frequency and two having center frequencies below the nominal frequency. The filters in tune filter 28 are separated from the nominal frequency by 6 Hz and the filters in tune filter 30 are separated from the nominal frequency by 7 Hz.

The two guard filters are further separated from the nominal frequency, and reduce the number of tune filters required to attain the resolution over a broad range of frequencies. The guard filters in tune filter 28 are separated from the nominal frequency by 36 Hz and the guard filters in tune filter 30 are separated from the nominal frequency by 42 Hz.

The closeness of the cluster of filters provides high frequency resolution, while the guard filters reduce the number of filters required to cover a broader range of frequencies, thus lowering the cost and complexity of the CAS detector. The tuned filters 28 and 30 are 2nd order IIR filters with the following transfer function:

$$H_k(z) = \frac{0.0122 + 0.0122 \cdot z^{-2}}{1 - b_k \cdot z^{-1} - 0.97559 \cdot z^{-2}}$$

where k and $b_k$ are given in Table 2.

The RMS values of each tune filter 28 and 30 output are computed and stored in an array named rms_tf[ ], which is indexed from 0–13. The RMS values at index 0, 6, 7, and 13 are denoted as rms_l1, rms_rl, rms_l2 and rms_r2. These values are used for RMS check in the Detection Logic Unit. The maximum value among each bank of tuned filters are found and denoted as rmst1 and rmst2. The corresponding frequency indices are denoted as index1 and index2. Blocks 32 and 34 show calculation and determination of the maximum value (rmst1 and rmst2) among each group and the corresponding index (index1 and index2).

The peaks of the RMS values (rmst1 and rmst2) are used to provide a trajectory of the frequency of the incoming signal and level of the tone of the incoming signal.

Figure 3:
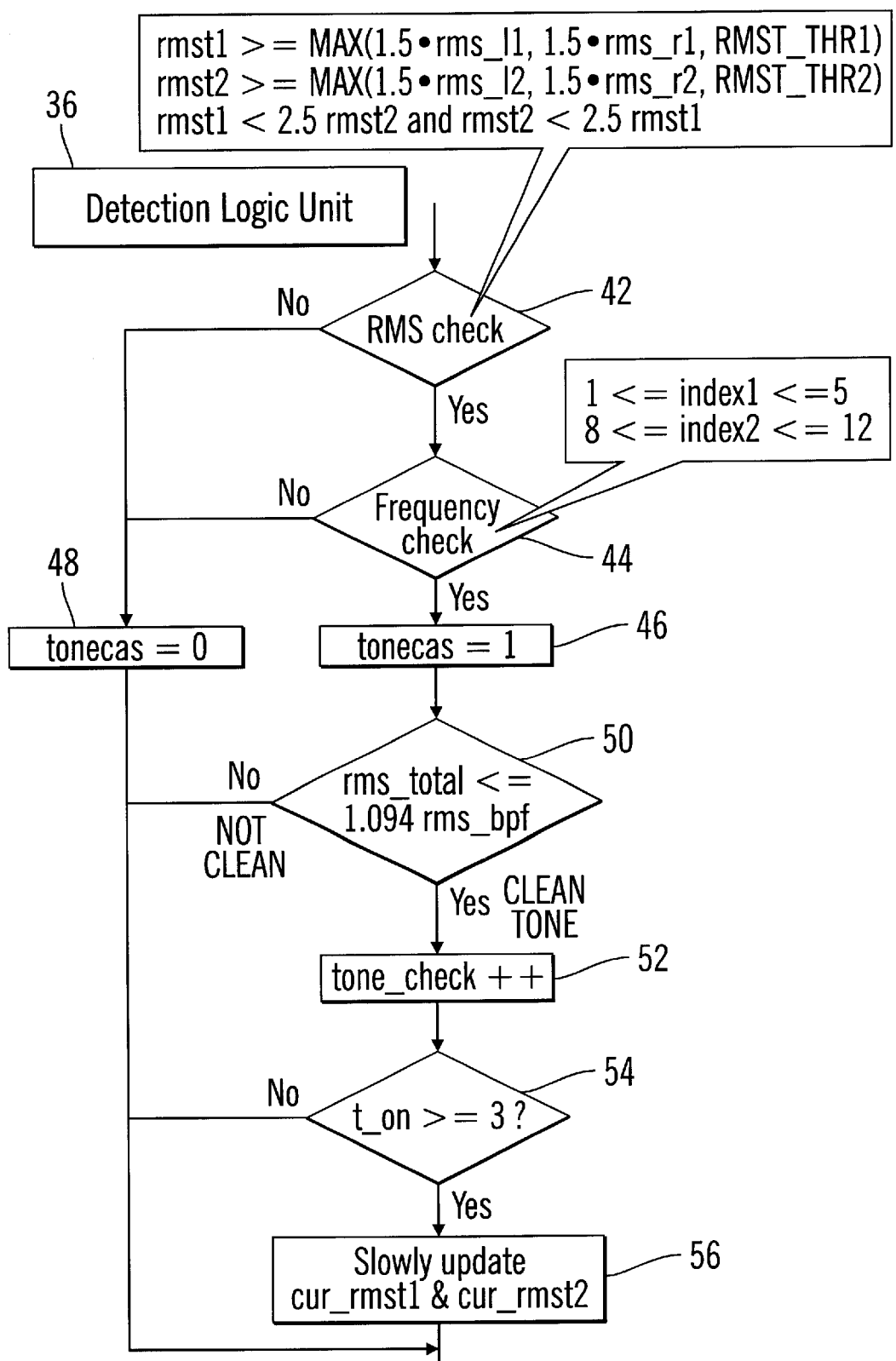
FIG. 3 illustrates a flowchart showing the logic flow in a detection logic unit utilized in the present invention.

Based on the information obtained from the tuned filters, information passes to the Detection Logic Unit (DLU) 36, which is described in FIG. 3 in more detail. The DLU 36 is used to verify the validity of the current block by checking the consistency of the trajectory of the frequency value of the incoming signal. Although non-CAS signals can imitate or approximate CAS signals for a brief period of time, e.g., 10–20 ms, only true CAS signals exhibit consistent frequency and levels over a longer period of time e.g., over 40 msec. The location of the peaks of the RMS values of the filter 28 and 30 outputs are used to provide a highly accurate (<7 Hz resolution) trajectory of the frequency and level of the tone. These parameters are used in the Detection Logic Unit 36 to separate a CAS signal from non-CAS signals, such as voice, music, or other data.

Figure 4:
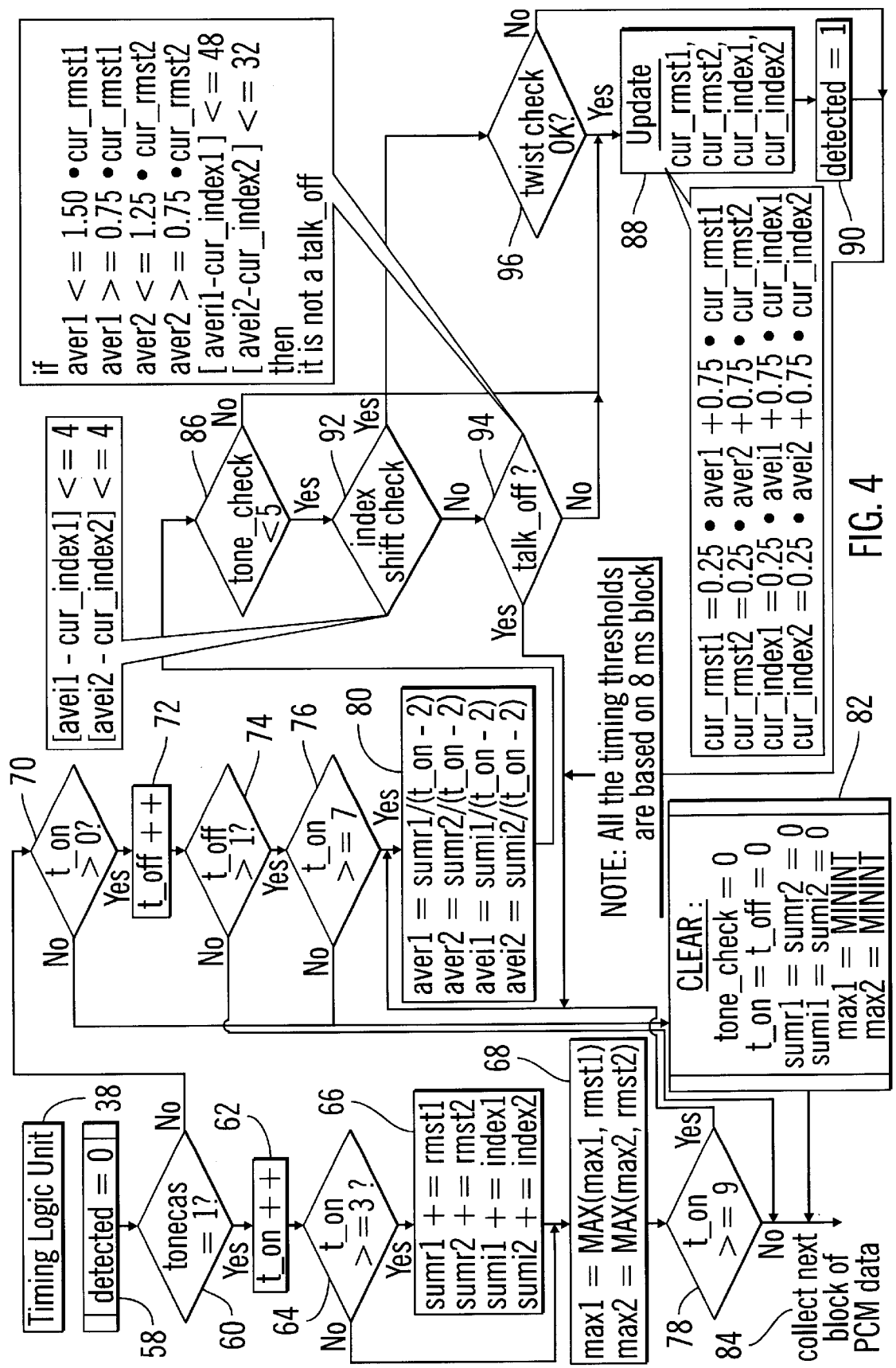
FIG. 4 illustrates a flowchart showing the logic flow in a timing logic unit utilized in the present invention.

The DLU 36 passes the validity information to the Timing Logic Unit (TLU) 38. The TLU 38, which is described in more detail in FIG. 4, is used to determine the final detection flag. Once the final detection flag is determined, the process is terminated in block 40.

Detection Logic Unit

FIG. 3 illustrates a flowchart showing the logic flow in a detection logic unit utilized in the present invention.

Referring now to FIG. 3, the detection logic unit 36 determines and sets a flag (tonecas) which indicates whether the current block is a potential CAS tone. There are several criteria that must be satisfied before the block is determined to be a CAS tone.

First, decision block 42 shows the DLU 36 doing a preliminary check on the signal. The RMS level of the signal is checked against and must exceed the following thresholds in block 42:

rmst1 ≧ RMST_THR1 and rmst2 ≧ RMST_THR2    (1)

where RMST_THR1 and RMST_THR2 are defined as 50.

Second, the RMS level must be 3 dB higher than that in the side band:

rmst1 ≧ 1.5·rms_l1 and rmst1 ≧ 1.5·rms_rl rmst2 ≧ 1.5·rms_l2 and rmst2 ≧ 1.5·rms_r2    (2)

Third, the twist, which is the difference in level between two tones, cannot exceed 8 dB. The levels of the peak RMS values are used to measure the twist and allow the CAS detector to reject out-of-specification CAS tones, as follows:

rmst1 < 2.5·rmst2 and rmst2 < 2.5·rmst1    (3)

Block 44 shows a frequency check of the signal, where the frequency found must be within ±0.5% of the nominal values:

1 ≦ index1 ≦ 5 and 8 ≦ index2 ≦ 12    (4)

If all the above four criteria are satisfied, block 46 shows tonecas being set to one. Otherwise, tonecas is set to zero in block 48, and the signal is determined not to be a CAS tone.

In addition to checking for the validation of a CAS tone, block 50 shows a that clean tone check is performed. This is performed by measuring the RMS signal level in a frequency region near the CAS nominal frequency e.g., from 2 kilohertz to 3 kilohertz, and comparing that to the RMS signal level of the entire incoming signal frequency band, e.g. the full telephone signal band, 300–3300 Hertz. This ratio determines if a CAS tone is "clean" or not "clean," and different detector logic is applied to the clean or not clean tones.

If rms_total ≦ 1.094·rms_bpf, the tone is a clean tone, and a tone_check counter is incremented by one in block 52. This is used to skip talk-off screen in the Timing Logic Unit.

Block 54 is a decision block to determine if the current block is a clean tone and t_on is greater than 2. If the decision in block 54 is yes, control passes to block 56, where the variables rmst1 and rmst2 are slowly integrated into target levels cur_rmst1 and cur_rmst2 using the following equations:

$$\text{cur\_rmst1} = \frac{1}{16} \cdot rmst1 + \frac{15}{16} \cdot \text{cur\_rmst1}$$

$$\text{cur\_rmst2} = \frac{1}{16} \cdot rmst2 + \frac{15}{16} \cdot \text{cur\_rmst2}$$

In order to screen out voice talk-off's more effectively, a history of CAS tones detected in the past is maintained. This is done by updating the target levels (cur_rmst1 and cur_rmst2) as well as the target frequencies (cur_index1 and cur_index2) as valid CAS tones are detected.

While the CAS signal characteristics may vary from one phone connection to another, for a given phone and connection the CAS signal characteristics and distortions are generally stable. The updating of the target levels in block 56 allows the detector to narrow the tolerance range of the CAS signal and more effectively reject non-CAS signals. This adaptive technique allows the detector to accommodate wider operating conditions for different installations while remaining as efficient as possible for each installation. Further, the adaptive technique of the present invention prevents as many talk-off conditions (false detection of CAS-imitative signals) as possible for a given installation.

The CAS target parameters cur_rmst1, cur_rmst2, cur_index1, and cur_index2 are adapted based on the quality of the detected CAS signal. If one frame of input data is detected as a clean CAS tone, the peak RMS values will be immediately integrated into target RMS values as shown in block 56. This allows the system to adapt sooner to different target levels when the CAS energy changes greatly due to unexpected telephone line conditions.

If the conditions in either block 50 or 56 are not satisfied, control passes to the end of the DLU 36, and the signal is passed on to the TLU 38.

Timing Logic Unit

FIG. 4 illustrates a flowchart showing the logic flow in a timing logic unit utilized in the present invention.

Referring now to FIG. 4, the timing logic unit utilizes the timing information to further verify that if a CAS tone is detected. A normal CAS tone lasts for 80–85 ms, which is 10–11 blocks of data.

Block 58 shows resetting the detection flag at the beginning of the DLU 38 process. Block 60 shows a verification of the tonecas variable value as received from DLU 36.

If tonecas is set to one, the Detection Logic Unit 36 found a valid block. If this is so, block 60 passes control to block 62, where a counter (t_on) is incremented by one to keep track of how many consecutive blocks have been ON (showing a CAS tone) so far.

Block 64 shows a decision block that determines if there have been three or more blocks of data that have contained a CAS tone. If there have been three or more blocks with a CAS tone, then block 66 updates the variables sumr1, sumr2, sumi1, and sumi2. Block 66 shows accumulating the RMS levels (rmst1 and rmst2) and frequency indices (index1 and index2) in sumr1, sumr2, sumi1 and sumi2 during ON time.

The RMS levels and frequency indices are averaged (aver1, aver2, avei1, and avei2) during ON time except for the first 24 ms. The response time of the tune filters is about 24 ms, so the tone information (RMS level and frequency) during the first 24 ms is not reliable. Block 68 shows storing the maximum values of rmst1 and rmst2 over ON time being stored in max1 and max2.

Due to the interference of voices, part of the CAS tone can be masked. Therefore, the present invention allows for one block of dropout (masking) to take care of this kind of situation.

To determine when this condition occurs, block 70 determines if there has been any blocks ON in the past. If so, block 72 updates a t_off variable. Block 74 then determines if there were two or more blocks in a row that were off by checking if t_off is greater than 1.

As soon as the Detection Logic Unit reports two invalid blocks of data, decision block 76 checks the value of t_on to see how long the tone has been on. Block 78 also checks the t_on variable to see if nine or more blocks have been ON consecutively. If t_on is greater than seven in block 76, or greater than nine from block 78, block 80 updates aver1, aver2, avei1 and avei2.

If block 76 determines that t_on is less than 7 (56 ms), all the variables are reset to start all over again in block 82. If the CAS tone is ON for more than nine blocks from block 78, or the variables were cleared in block 80, the next block of PCM data is collected in step 84.

From block 80, a further check is made to determine if it is a clean tone. Block 86 determines if it is a clean tone where tone_check $\leq 5$. If so, there is no need to do further talk-off screen. Block 88 is then used to update variables aver1, aver2, avei1, and avei2 and the target tone values cur_rmst1, cur_rmst2, cur_index1 and cur_index2 using the following equations:

$$cur\_rmst1 = \tfrac{1}{4} \cdot aver1 + \tfrac{3}{4} \cdot cur\_rmst1$$

$$cur\_rmst2 = \tfrac{1}{4} \cdot aver2 + \tfrac{3}{4} \cdot cur\_rmst2$$

$$cur\_index1 = \tfrac{1}{4} \cdot avei1 + \tfrac{3}{4} \cdot cur\_index1$$

$$cur\_index2 = \tfrac{1}{4} \cdot avei2 + \tfrac{3}{4} \cdot cur\_index2$$

Block 88 also allows the present invention to adapt to each specific installation to locate as many CAS tones as possible without detecting false CAS imitative tones.

If a non-clean CAS tone is detected as in block 88, the frequency index and RMS levels are accumulated and averaged over the duration of the tone, but these values are not used to update target parameters until the tone is fully validated by the CAS detector. This delayed adaptation strategy, using a weighted running average, delays the algorithm of the present invention from adapting to talk-off signals.

Once the talk-off screen is passed, all the target values are updated and block 90 sets the detection flag to one.

If tone_check is <5, block 92 does an index shift check, where the absolute value of avei1−cur_index1 and the absolute value of avei2−cur_index2 are compared to the value four. If this test fails, talk off is checked in block 94.

The talk-off screen condition verified in block 94 is a very strict criterion that requires both RMS levels and frequency indices to fall within a close range of target values:

$$0.75 \cdot cur\_rmst1 \leq aver1 < 1.5 \cdot cur\_rmst1$$

$$0.75 \cdot cur\_rmst2 \leq aver2 < 1.25 \cdot cur\_rmst2$$

$$|avei1 - cur\_index1| \leq 0.75$$

$$|avei2 - cur\_index2| \leq 0.5$$

If block 92 fails, a second twist check is done in block 96. Control then passes back to block 88.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| Group | #1 | | | | | | #2 | | | | | | | |
|---|---|---|---|---|---|---|---|---|---|---|---|---|---|---|
| freq | 94 | 11 | 12 | 13 | 13 | 14 | 16 | 70 | 73 | 74 | 75 | 75 | 76 | 79 |
| (Hz) | | 8 | 4 | 0 | 6 | 2 | 6 | 8 | 6 | 3 | 0 | 7 | 4 | 2 |
| index | 0 | 1 | 2 | 3 | 4 | 5 | 6 | 7 | 8 | 9 | 10 | 11 | 12 | 13 |

TABLE 2

| index k | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| freq. (Hz) | 94 | 118 | 124 | 130 | 136 | 142 | 166 | 708 | 736 | 743 | 750 | 757 | 764 | 792 |
| $b_k$ | 1.89014 | 1.84143 | 1.83069 | 1.81317 | 1.79803 | 1.78229 | 1.71301 | 1.20105 | 1.33423 | 1.36591 | 1.39697 | 1.42737 | 1.45709 | 1.56866 |

What is claimed is:

1. A method for detecting a frequency component of an incoming signal, comprising the steps of:
   measuring an RMS level, a twist, a side band, and a frequency of the incoming signal;
   verifying that the RMS level of the incoming signal exceeds a threshold;
   verifying that the RMS level of the incoming signal exceeds that of a level of the side band of the incoming signal;
   verifying that the twist of the incoming signal does not exceed a given value;
   verifying that the frequency of the incoming signal is within a percentage of a nominal value for the incoming signal; and
   enabling continued receipt of an incoming signal based on the verification of the RMS level, the verification of the twist, and the verification of the frequency of the signal.

2. The method of claim 1, wherein the frequency is measured by a bank of filters.

3. The method of claim 2, wherein the bank of filters is comprised of at least one tune filter and at least one guard filter, the tune filter having a center frequency spaced by a first predetermined amount from a center frequency of the incoming signal, and the guard filter having a center frequency spaced by a second predetermined amount from the center frequency of the incoming signal.

4. The method of claim 2, wherein the incoming signal is downsampled before the frequency is measured by the bank of filters to reduce a computational complexity of the bank of filters.

5. The method of claim 2, wherein the frequency of the incoming signal is measured by locating a peak RMS level of the bank of filters.

6. The method of claim 4, wherein the RMS value of the incoming signal is measured by locating a peak output of the down-sampled output of the filter bank.

7. The method of claim 4, wherein the twist is verified by measuring the levels of an output of the down-sampled output of the filter bank.

8. The method of claim 1, wherein the RMS level is measured as a ratio of a frequency band near the alert signal tone versus a signal band of the incoming signal.

9. The method of claim 1, further comprising the step of estimating the RMS level of the incoming signal.

10. The method of claim 9, wherein the step of estimating averages the incoming signal with the estimated RMS level.

11. The method of claim 1, further comprising the step of adapting a target RMS level to the RMS level of the incoming signal.

12. The method of claim 11, wherein the step of adapting resets the target RMS level to the RMS level of the incoming signal.

13. The method of claim 11, wherein the step of adapting averages the target RMS level with the RMS level of the incoming signal.

14. An apparatus for detecting a frequency component of an incoming signal, comprising:
   one or more processing elements for measuring an RMS level, a twist, a side band, and a frequency of an incoming signal, for verifying that the RMS level of the incoming signal exceeds a threshold, for verifying that the RMS level of the incoming signal exceeds that of a level of the side band of the incoming signal, for verifying that the twist of the incoming signal does not exceed a given value, for verifying that the frequency of the incoming signal is within a percentage of a nominal value for the incoming signal, and for enabling continued receipt of an incoming signal based on the verification of the RMS level, the verification of the twist, and the verification of the frequency of the signal.

15. The apparatus of claim 14, wherein the processing element that measures frequency is a bank of filters.

16. The apparatus of claim 15, wherein the bank of filters is comprised of at least one tune filter and at least one guard filter, the tune filter having a center frequency spaced by a first predetermined amount from a center frequency of the incoming signal, and the guard filter having a center frequency spaced by a second predetermined amount from the center frequency of the incoming signal.

17. The apparatus of claim 16, wherein the incoming signal is downsampled before the frequency is measured by the bank of filters to reduce a computational complexity of the bank of filters.

18. The apparatus of claim 15, wherein the frequency of the incoming signal is measured by locating the peak RMS level of the bank of filters.

19. The apparatus of claim 17, wherein the RMS value of the incoming signal is measured by locating a peak output of the down-sampled output of the filter bank.

20. The apparatus of claim 17, wherein the twist is verified by measuring the levels of an output of the down-sampled output of the filter bank.

21. The apparatus of claim 20, wherein the RMS level is measured as a ratio of a frequency band near the alert signal tone versus a signal band of the incoming signal.

22. The apparatus of claim 20, wherein the RMS level of the incoming signal is estimated prior to receipt of the incoming signal.

23. The apparatus of claim 22, wherein the estimated RMS level is averaged with the RMS level of the incoming signal.

24. An article of manufacture comprising one or more processing elements capable of performing method steps for detecting customer premises equipment alert signal tones, the method comprising the steps of:
   measuring an RMS level, a twist, a side band, and a frequency of an incoming signal;
   verifying that the RMS level of the incoming signal exceeds a threshold;
   verifying that the RMS level of the incoming signal exceeds that of a level of the side band of the incoming signal;

verifying that the twist of the incoming signal does not exceed a given value;

verifying that the frequency of the incoming signal is within a percentage of a nominal value for the incoming signal; and enabling continued receipt of an incoming signal based on the verification of the RMS level, the verification of the twist, and the verification of the frequency of the signal.

25. A method for detecting a frequency component of an incoming signal, comprising the steps of:

measuring an RMS level and a side band of an incoming signal;

determining whether a RMS level of the incoming signal exceeds a level of the side band of the incoming signal; and disabling continued receipt of an incoming signal upon the RMS level of the signal not exceeding a level of the side band.

26. A method of claim 25 further comprising the steps of:

measuring a twist of the incoming signal;

determining whether the twist of the incoming signal does not exceed a given value; and disabling continued receipt of an incoming signal upon, at least one of the twist of the signal equaling or exceeding said given value.

27. A method of claim 25 further comprising the steps of:

measuring a frequency of the incoming signal;

determining whether the frequency of the incoming signal is within a percentage of a nominal value for the incoming signal; and disabling continued receipt of an incoming signal upon the frequency of the signal not being within said percentage of a nominal value for the incoming signal.

28. A method of claim 25 further comprising the steps of:

determining whether the RMS level of the incoming signal exceeds a threshold; and disabling continued receipt of an incoming signal upon the RMS level of the signal not exceeding said threshold.

29. An apparatus for detecting a frequency component of an incoming signal, comprising:

one or more processing elements for measuring an RMS level and a side band, for determining whether the RMS level of the incoming signal exceeds a level of the side band of the incoming signal, and for disabling continued receipt of an incoming the RMS level of the signal not exceeding the level of the side band.

30. An apparatus of claim 29 further comprising:

one or more processing elements for measuring a twist of an incoming signal, for determining whether the twist of the incoming signal does not exceed a given value, and for disabling continued receipt of an incoming signal upon, at least one of, the twist of the signal equaling or exceeding said given value.

31. An apparatus of claim 29 further comprising:

one or more processing elements for measuring a frequency of an incoming signal, for determining whether the frequency of the incoming signal is within a percentage of a nominal value for the incoming signal; and for disabling continued receipt of an incoming signal upon the frequency of the signal not being within said percentage of a nominal value for the incoming signal.

32. An apparatus of claim 29 further comprising:

one or more processing elements for determining whether the RMS level of the incoming signal exceeds a threshold, and for disabling continued receipt of an incoming signal upon the RMS level of the signal not exceeding said threshold.

* * * * *